United States Patent Office 3,526,022
Patented Sept. 1, 1970

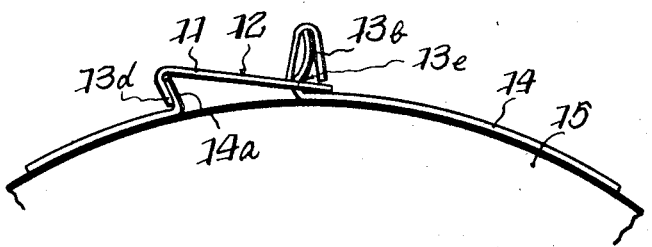
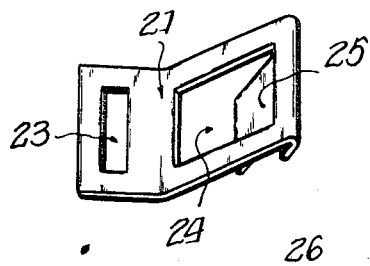
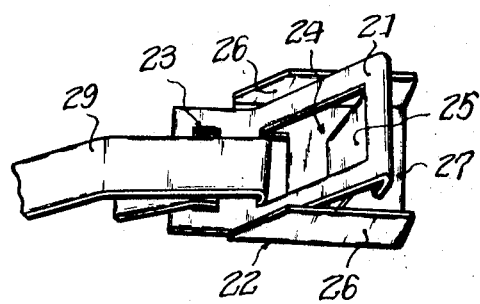
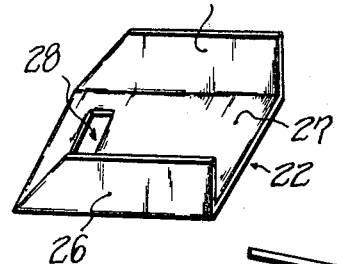
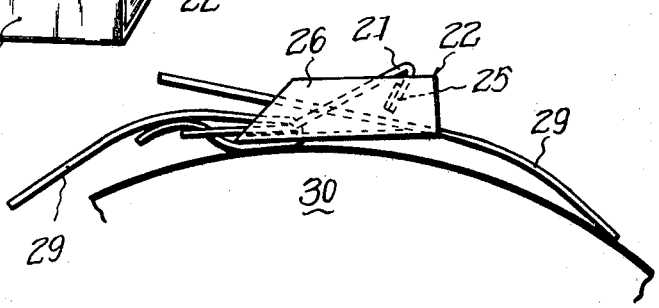

3,526,022
FITTING
Mitsuji Ichikawa, Tokyo, Japan, assignor to Eiraku Sangyo Kabushikikaisha, Tokyo, Japan, a company of Japan
Filed July 22, 1968, Ser. No. 746,441
Int. Cl. B65d 63/06
U.S. Cl. 24—23    2 Claims

ABSTRACT OF THE DISCLOSURE

The connector comprises a substantially flat body portion having a tongue extending at an angle thereto, and having a slot arranged to permit the end of a band to be passed outward through the slot and then folded around the tongue. The tongue is so arranged relative to the slot that a free span of the band extends to the end of the tongue and is placed under tension to tighten the band when the tongue is bent substantially into the plane of the body portion.

BACKGROUND OF THE INVENTION

This invention relates to a connector to secure the end of a band, for example a band surrounding an electric pole, also for use in bundling cables on a ship.

As a conventional fitting has been installed by a bolt to an electric pole, the head of the bolt projecting from the surface of the fitting has hindered working on the electric pole.

In addition, as a conventional fitting has been installed by a bolt, the bolt is apt to strain the surface of the pole.

SUMMARY OF THE INVENTION

This invention has for an object to provide a connector by means of which the ends of a band can be secured and the band can be tightened without using a bolt.

According to this invention, a band can be secured on an electric pole and working on the electric pole is not hindered, and the connection is not loosened by vibration.

Also the present connector is not affected by the radius of the electric pole.

And also the present connector can be used to secure a band very safely on an electric pole.

And also the present connector is easily manufactured and is convenient to use.

DESCRIPTION OF THE DRAWING

FIG. 7 is a view illustrating the manner in which a band is secured by means of the connector shown in FIG. 6.

FIG. 8 is a perspective view of a further form of connector.

FIG. 9 is a perspective view of an assembly including the connector shown in FIG. 8.

DESCRIPTION OF THE PREFERRED EMBODIMENT

In the embodiment shown in FIGS. 1, 2, 3 and 4, a slot 2 to receive a band is punched in a rectangle in the center of the body portion of a metal plate, which has its both ends bent to form tongues extending at an angle to the body portion of the plate.

In the bending operation, each tongue 3a, 3b is formed by bending to form a circular portion or an obtuse angle 1a at the base of the tongue.

Figure 1:
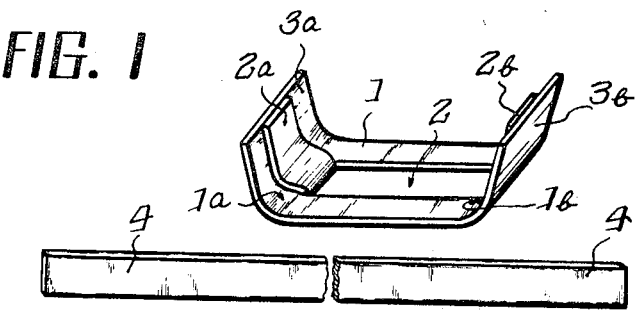
FIG. 1 is a perspective view of a band end connector embodying the invention.

Moreover, as shown in FIG. 1, each half of the metal which is punched out of the slot 2 in the body portion 1 forms a reinforcing piece 2a, 2b on each of the tongues 3a, 3b.

4 shows a band which may be cut in a length slightly greater than the circumference of the electric pole 5 or may be wound in a coil-winding. When a long band wound in a coil-winding is used, it may be cut in a length equal to several times the circumference of the electric pole 5.

Figure 2A:
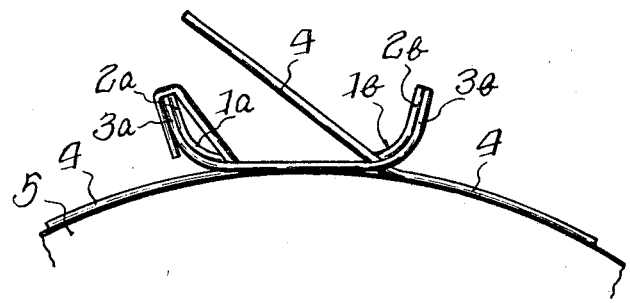
FIGS. 2 (a), (b) and (c) are views illustrating the manner in which a band is secured by a connector of the type shown in FIG. 1.

When the band 4 is installed on the electric pole 5 as shown in FIG. 2a, one end of the band 4 cut in a length slightly greater than the circumference of the electric pole 5 and passed through the slot 2 in the body portion 1 is secured by bending or folding it around the outer end of one tongue 3a. Next, the band 4 is installed tightly by passing the other end of the band 4 through the slot 2 and drawing it tight while it is gripped by a pair of pliers and then folding it around the end of the other tongue 3b.

Figure 2B:
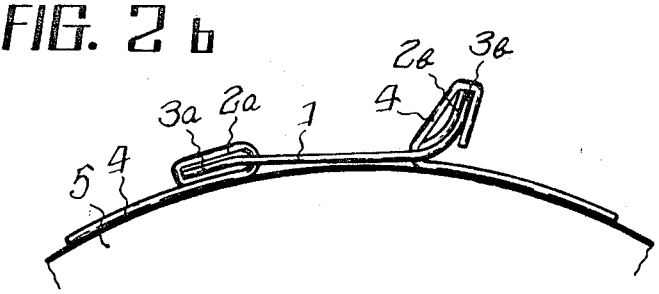
Figure 2C:
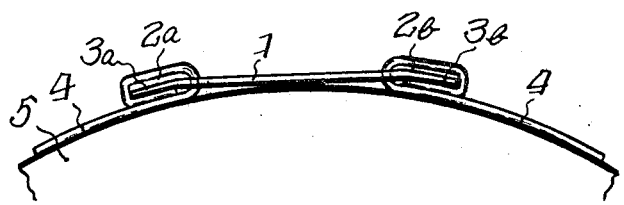

Next, as shown in FIGS. 2b, 2c, the tongue is bent down to the outer side by a pair of pliers or the like, and it is struck by a hammer to render each tongue parallel to the outer surface of the band 4.

In the condition shown in FIG. 2a, one end of the band 4 includes a free span extending to the end of the tongue 3a and the tongue is formed in a bow-shape, so that when the tongue is bent substantially into the plane of the body portion 1 as shown in FIG. 2c, the band 4 is placed under tension to tighten the band. In such a condition, when the tongue is bent to the arrow direction by a pair of pliers or the like, the tongue is elongated in proportion with its initial degree of curvature so that the band 4 is tensioned enough to form a tight grip around the electric pole.

Figure 3:
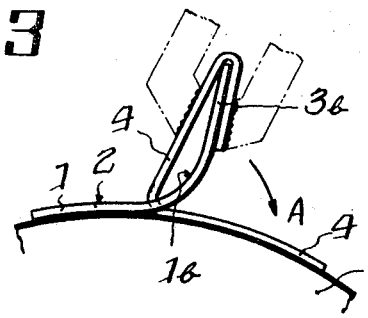
FIG. 3 is a view illustrating the manner in which pliers are used in performing the securing operation.

In the condition which exists after the tongue 3b in FIG. 3 has been bent in the A-direction, as the band 4 is bent over the end of the tongue 3b and an edge of the slot 2, if it is vibrated it is not loosened because of these two points of friction resistance viz. it does not slip in the direction of tension.

Figure 5:
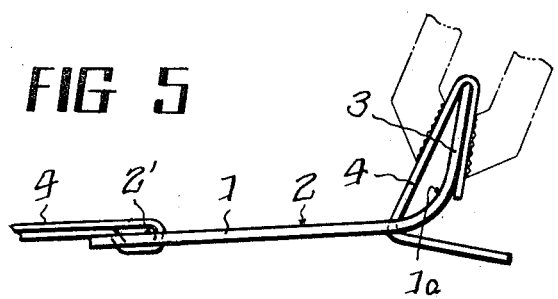
FIG. 5 is a view similar to FIG. 3, showing a modified form of connector.

FIG. 5 shows another example of a band end connector and this construction comprises a tongue 3 having a circular portion 1a bent in one end, a slot 2 punched in a body portion 1 and a hole 2′ punched in the other end. When a band 4 is to be installed on an electric pole, the tongue 3 may be bent down after the end of the band has been passed through the slot 2 and folded around the end of the tongue.

Figure 6:
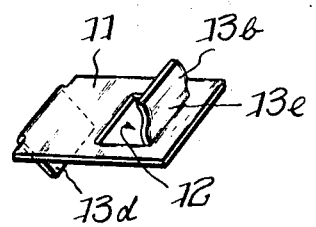
FIG. 6 is a perspective view of a further example.

FIG. 6 shows another example of a band end connector embodying the invention. In FIG. 6, a body portion 11 comprises a slot 12 having beside its right side a tongue 13b which can be bent outward, and which has a circular portion 13e adjacent to its base. There is another tongue 13d forming a V-shaped on the left side of the metal plate.

As shown in FIG. 7, one end of the band 14 wound on the electric pole 15 is bent around the outer end of the tongue 13b after being passed outward through the slot 12, and another end of the band 14 is bent around the inner end of the tongue 13d to form a V-shape.

Further, the tongue 13d and the end portion 14a as well as the tongue 13b and the other end of the band 14 are bent down by a pair of pliers or the like.

Therefore, one end of the band 14 is placed under tension and wound closely on the electric pole along the circular surface thereof due to the straightening of the curved portion of the tongue 13b.

Further, the other end of the band 14 is secured tightly enough so that it cannot escape because it is interlocked with the tongue 13d of the connector.

Figure 10B:
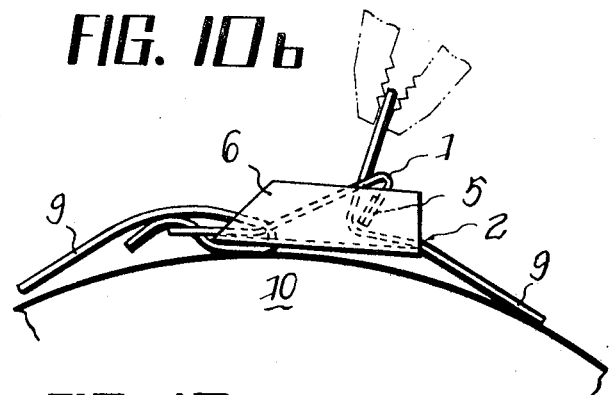
FIGS. 10(a), (b), (c) and (d) are views illustrating the manner in which a band is secured by means of the assembly shown in FIG. 9.
Figure 10C:
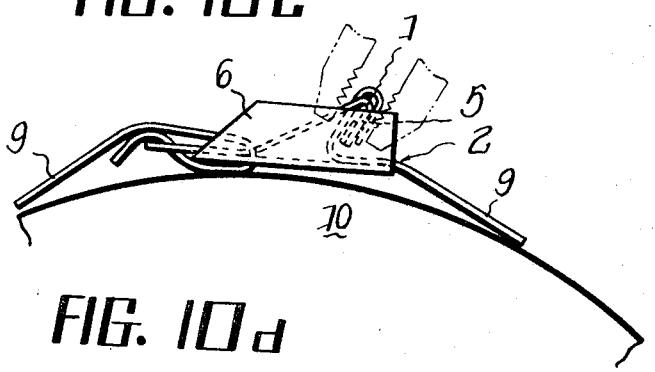
Figure 10D:
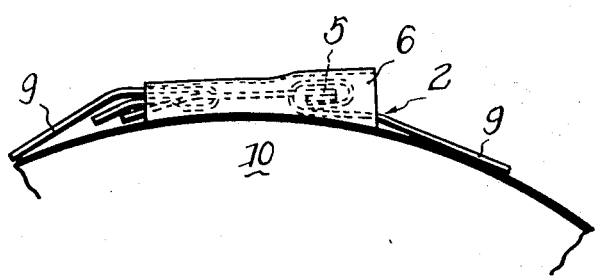

Referring to FIGS. 8 to 10, the connector comprises a middle piece 21 and the outer side piece 22. The middle piece 21 comprises a first slot 23 of rectangle-shape punched near the left side of the metal plate, the extended portion being bent up, the second slot 24 of rectangle-shape punched in the central part of the extended portion, and a tongue piece 25 bent at an angle to the extended body portion in a downward direction.

The outer side piece 22 comprises outwardly extending wings 26, 26 at both sides of the bottom portion 27 as shown in FIG. 8.

The distance between the slot 28 and the left side of the outer side piece 22 is equal to the distance between the first slot 23 of the middle piece 21 and the second window portion 24. 29 shows a stainless steel band, 30 shows the electric pole. A detailed explanation is given below concerning the operation in the case of a band wound on an electric pole.

The stainless steel belt 29 is cut to a length slightly greater than the outer circumference of the electric pole 30, and is bent at one end, and that end is passed through the window portion 28 punched in the outer piece 22 after being passed through the second window portion 24 of the middle piece 21. It is then inserted upward through the first slot 23 of the middle piece 21 and one end of the stainless steel band 29 thus serves to lock together the middle piece 21 and the outer side piece 22 and is secured by tugging it (see FIG. 9).

Another end of the stainless steel band 29 wound around the electric pole 30 is tugged through the second slot 24 after being inserted between the middle piece 21 and the outer side piece 22.

It is bent or folded around the base of the tongue piece 25 of the middle piece 21.

In such condition, the stainless steel band is provisionally bound at the electric pole 30.

The stainless steel band which is folded around the base of the tongue, together with the tongue itself, is bent toward the electric pole 30, the tongue piece 25 of the middle piece 21 and the surrounding portion of the stainless steel band 29 being gripped by a pair of pliers in order to make the bend.

Further, the wings 26, 26 formed at both sides of the outer piece 22 are bent down inward and thus envelop the middle piece 21 and the stainless steel band 29.

Moreover, the stainless steel band 29 is gripped on the electric pole 30.

When tension occurs in the stainless steel band 29, the tongue piece 25 of the middle piece 21 tends to rise but is considered to be able to support large loads because rising of the tongue piece 25 is prevented by the bent-down wings of the outer side piece 22.

Figure 11:
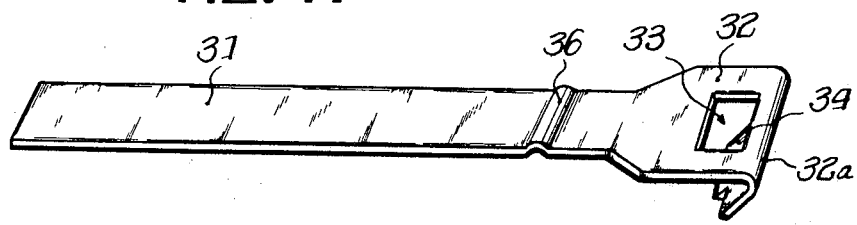
FIG. 11 is a perspective view of another connector embodying the invention.

Referring to FIGS. 11 and 12 which show another example of a connector embodying the invention, this connector comprises a middle piece 32 formed at the end of the band 31, a slot 33 punched in the middle piece 32 and a tongue piece 34 bent in a downward direction.

The wire channel 36 to receive a bond wire 35 on the pole 37 is formed beside the middle piece 32 of the band 31.

A detailed explanation is given below of the operation in the case of a band wound on an electric pole.

Figure 12A:
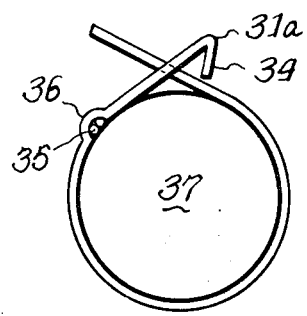
FIGS. 12(a), (b) and (c) are views illustrating the manner in which a band is secured by means of the connector shown in FIG. 11.
Figure 12B:
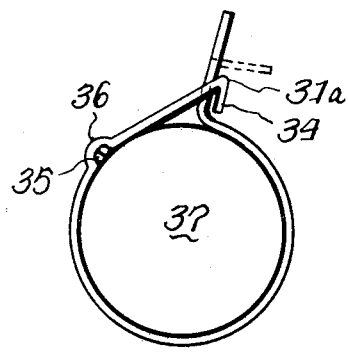
Figure 12C:
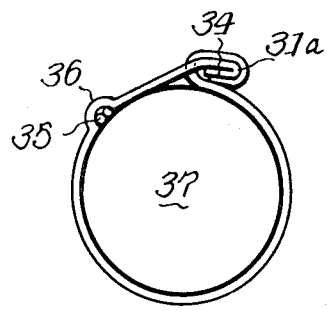

Referring to FIGS. 12a, 12b, and 12c, a band 31 is wound on the electric pole 37, and an end portion of the band 31 is passed through the slot 33 of the middle piece 32 and it is gripped by pliers to fold it around the base of the tongue piece 34.

Further, it is struck to bend it down to tighten the band.

Figure 13:
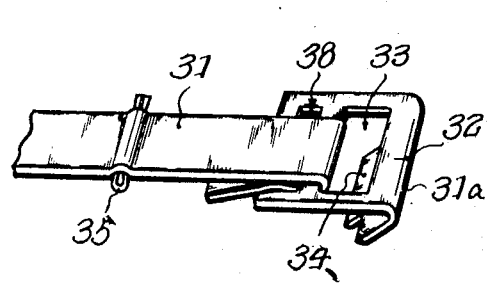
FIG. 13 is a perspective view of another assembly including the connector shown in FIG. 8.

Moreover as shown in FIG. 13 the connector may comprise a middle piece 32 in which an additional slot 38 is punched parallel to the slot 33 and it may be secured to the band 1 as indicated in FIG. 13.

Figure 14:
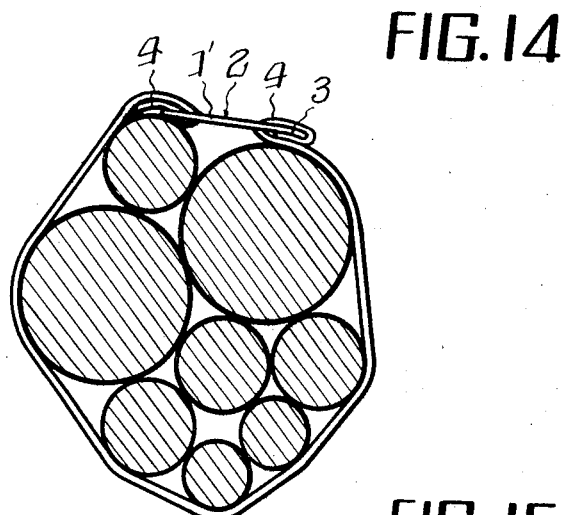
FIG. 14 is a view illustrating another use of the connector.

Moreover this invention is useful not only with an electric pole but also in uniting wires on a ship (FIG. 14).

Figure 4:
FIG. 4 is a view illustrating the appearance of the parts when the operation shown in FIG. 3 has been completed.

FIG. 14 shows a use for a fitting shown in FIG. 3 to FIG. 5.

Figure 15:
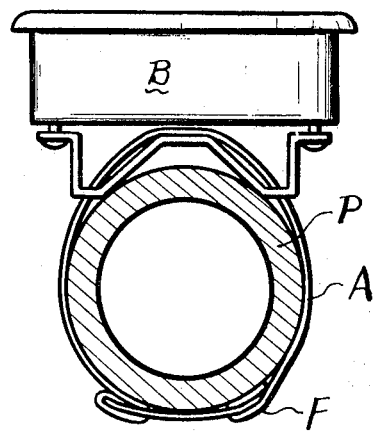
FIG. 15 is a view illustrating a connector which fastens a metal band to the cross arm of an electric pole.

FIG. 15 shows a metal fitting installed on an electric pole with a band (A) above mentioned and also shows the method of installing a junction box on the electric pole by means of a connector F.

I claim:
1. A band end connector comprising a substantially flat body portion and a tongue extending at an angle to the body portion, there being a slot in the body portion, arranged to permit the end of a band to be passed outward through the slot and then folded around the tongue, the tongue extending inward from the body portion and being so arranged relative to the slot as to permit the end of a band to be passed under the end of the tongue and outward through the slot, and then folded around the base of the tongue, the band then being adapted to be tightened by bending the tongue against the underside of the body portion.

2. A band end connector according to claim 1 wherein at least one outwardly extending wing is provided in a position to be bent inward upon the body portion to retain the tongue in its position against the underside of the body portion.

References Cited

UNITED STATES PATENTS

| | | | |
|---|---|---|---|
| 224,586 | 2/1880 | Earle | 24—22 XR |
| 404,383 | 6/1889 | Clark | 24—21 |
| 823,591 | 6/1906 | Eager. | |
| 1,270,193 | 6/1918 | Nelson. | |
| 2,075,720 | 3/1937 | Hoffmann. | |
| 3,143,325 | 8/1964 | Carpenter et al. | |
| 3,370,122 | 2/1968 | Ichikawa. | |

DONALD A. GRIFFIN, Primary Examiner

U.S. Cl. X.R.
24—20; 248—74